United States Patent
Usami et al.

(10) Patent No.: US 8,980,486 B2
(45) Date of Patent: Mar. 17, 2015

(54) FUEL CELL

(75) Inventors: Sho Usami, Susono (JP); Yasushi Araki, Gotemba (JP); Kazunori Shibata, Mishima (JP); Shuya Kawahara, Gotemba (JP); Tomohiro Ogawa, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 106 days.

(21) Appl. No.: 13/702,242

(22) PCT Filed: Jun. 17, 2010

(86) PCT No.: PCT/JP2010/004036
§ 371 (c)(1),
(2), (4) Date: Dec. 5, 2012

(87) PCT Pub. No.: WO2011/158295
PCT Pub. Date: Dec. 22, 2011

(65) Prior Publication Data
US 2013/0089798 A1 Apr. 11, 2013

(51) Int. Cl.
*H01M 4/14* (2006.01)
*H01M 8/04* (2006.01)
*H01M 8/10* (2006.01)

(52) U.S. Cl.
CPC ...... *H01M 8/04291* (2013.01); *H01M 8/04029* (2013.01); *H01M 8/04156* (2013.01); *H01M 8/04223* (2013.01); *H01M 8/04253* (2013.01); H01M 2008/1095 (2013.01); Y02E 60/50 (2013.01)

USPC .......... 429/414; 429/429; 429/428; 429/433; 429/444

(58) Field of Classification Search
USPC .......................... 429/414, 429, 428, 433, 444
See application file for complete search history.

(56) References Cited

U.S. PATENT DOCUMENTS

| | | | |
|---|---|---|---|
| 5,798,186 A | 8/1998 | Fletcher et al. | |
| 2003/0017375 A1 | 1/2003 | Kanno | |
| 2004/0001982 A1 | 1/2004 | Reiser et al. | |
| 2006/0141309 A1* | 6/2006 | Miyata et al. | 429/24 |
| 2009/0110970 A1 | 4/2009 | Tejima | |
| 2009/0208786 A1 | 8/2009 | Manabe et al. | |
| 2010/0028728 A1* | 2/2010 | Clingerman et al. | 429/13 |
| 2012/0308905 A1 | 12/2012 | Kawahara et al. | |

FOREIGN PATENT DOCUMENTS

| | | |
|---|---|---|
| CN | 101473479 A | 7/2009 |
| JP | 9-259913 A | 10/1997 |
| JP | 2000-512068 A | 9/2000 |
| JP | 2003-36874 A | 2/2003 |
| JP | 2005-129448 A | 5/2005 |
| JP | 2005-276568 A | 10/2005 |
| JP | 2006-80027 A | 3/2006 |
| JP | 2006-134670 A | 5/2006 |
| JP | 2006-286573 A | 10/2006 |
| JP | 2007-12564 A | 1/2007 |
| JP | 2007-172962 A | 7/2007 |
| JP | 2007-305346 A | 11/2007 |
| JP | 2008-147093 A | 6/2008 |

(Continued)

*Primary Examiner* — Jane Rhee
(74) *Attorney, Agent, or Firm* — Sughrue Mion, PLLC

(57) ABSTRACT

A fuel cell system 10 removes water retaining in a cathode catalyst layer 217 in a fuel cell 20, after a start-up of the fuel cell 20 and before feed of coolant to the fuel cell 20.

8 Claims, 12 Drawing Sheets

(56) References Cited

FOREIGN PATENT DOCUMENTS

| | | | |
|---|---|---|---|
| JP | 2008-305696 A | 12/2008 | |
| JP | 2009-110684 A | 5/2009 | |
| JP | 2011-113774 A | 6/2011 | |

* cited by examiner

FUEL CELL

CROSS REFERENCE TO RELATED APPLICATIONS

This application is a National Stage of International Application No. PCT/JP2010/004036 filed Jun. 17, 2010, the contents of which are incorporated herein by reference in their entirety.

TECHNICAL FIELD

The present invention relates to a fuel cell that generates electric power through the electrochemical reaction of hydrogen with oxygen and more specifically to a technique of operating the fuel cell in a cold environment.

BACKGROUND ART

The fuel cell is known to have the stack structure obtained by alternately stacking a plurality of membrane electrode assemblies (hereinafter referred to as "MEA"), wherein each MEA includes electrode layers formed on respective surfaces of an electrolyte membrane, and separators that separate adjacent membrane electrode assemblies. Each of the separators in the fuel cell has a flow channel configured to make a flow of hydrogen gas toward an anode side of the MEA, a flow channel configured to make a flow of an oxidizing gas toward a cathode side of the MEA and a flow channel configured to make a flow of a coolant for cooling down the fuel cell. During power generation by the fuel cell, water is produced on the cathode side of the MEA accompanied with the electrochemical reaction of hydrogen with oxygen. This produced water in the MEA may be frozen in a cold environment. This may lead to significant degradation of the MEA.

During a start-up of the fuel cell in the cold environment, one proposed technique suspends the feed of cooling water to the fuel cell until a rise of the temperature of the fuel cell, so as to prevent an extreme temperature decrease of the fuel cell by the flow of cooling water (for example, Patent Literature 1).

CITATION LIST

Patent Literatures

PTL1: JP 2003-36874A

SUMMARY

Technical Problem

Even when the feed of cooling water is suspended in the cold environment until the rise of temperature of the fuel cell, however, the start of the feed of cooling water provisionally lowers the once increasing temperature of the fuel cell to the freezing range and may cause the produced water in the MEA to be frozen.

In order to solve at least part of the foregoing, the object of the invention is to provide a technique of reducing degradation of the fuel cell in the cold environment.

Solution to Problem

In order to achieve at least part of the foregoing, the invention provides aspects and embodiments described below.

(First Aspect)

A fuel cell system of the first aspect is directed to a fuel cell system that operates a fuel cell configured to generate electric power through electrochemical reaction of hydrogen with oxygen, the fuel cell system comprising: a cooling pump configured to feed a coolant to the fuel cell; and a water remover configured to remove water retaining in a cathode catalyst layer formed on a cathode side of an electrolyte membrane in the fuel cell, after a start-up of the fuel cell and before feed of the coolant by the cooling pump. The fuel cell system of the first aspect removes the water retaining in the cathode catalyst layer of the fuel cell prior to the feed of the coolant to the fuel cell. This configuration effectively prevents water from being frozen in the cathode catalyst layer of the fuel cell even when the feed of the coolant starts in the cold environment.

(Second Aspect)

In the fuel cell system of the first aspect, the fuel cell may include a cathode flow channel configured to make a flow of an oxidizing gas toward the cathode side of the electrolyte membrane, and the water remover may remove the water retaining in the cathode catalyst layer by introducing the oxidizing gas into the cathode flow channel in a state that electric current of the fuel cell is suspended, after the start-up of the fuel cell and before the feed of the coolant by the cooling pump. The fuel cell system of the second aspect can remove the water retaining in the cathode catalyst layer by using the structure of supplying the oxidizing gas to the fuel cell.

In the fuel cell system of the second aspect, the flow direction in the cathode flow channel is upward along the direction of gravity during power generation by the fuel cell. The water remover may remove the water retaining in the cathode catalyst layer by introducing the oxidizing gas into the cathode flow channel in the flow direction that is downward along the direction of gravity, in the state that electric current of the fuel cell is temporarily suspended, after the start-up of the fuel cell and before the feed of the coolant by the cooling pump. This configuration enables efficient removal of the retaining water in the cathode catalyst layer by using the gravity.

(Third Aspect)

In the fuel cell system of either one of the first and second aspect, the fuel cell may further comprise: a melt detector configured to detect melt of water frozen in the cathode catalyst layer, and the water remover may start removal of the water retaining in the cathode catalyst layer when the melt of frozen water is detected by the melt detector, after the start-up of the fuel cell and before the feed of the coolant by the cooling pump. The fuel cell system of the third aspect enables efficient removal of the water in the cathode catalyst that is frozen at the time of start-up of the fuel cell.

(Fourth Aspect)

In the fuel cell system of the third aspect, the melt detector may detect the melt of the water frozen in the cathode catalyst layer, based on an internal resistance of the fuel cell. The fuel cell system of the fourth aspect enables the melt of frozen water in the cathode catalyst layer to be detected by the simpler configuration than the configuration of providing temperature sensors in respective parts of the cathode catalyst layer.

(Fifth Aspect)

In the fuel cell system of any one of the first through fourth aspect, the fuel cell system may further comprise: a remaining water detector configured to detect an amount of remaining water in the cathode catalyst layer, and the water remover may terminate removal of the water retaining in the cathode catalyst layer, based on the amount of remaining water detected by the remaining water detector. The fuel cell system of the fifth aspect effectively prevents the coolant from being fed to the fuel cell in the state of insufficient removal of the retaining water from the cathode catalyst layer.

(Sixth Aspect)

In the fuel cell system of the fifth aspect, the fuel cell may include a cathode flow channel configured to make a flow of an oxidizing gas toward the cathode side of the electrolyte membrane, and the remaining water detector may detect the amount of remaining water in the cathode catalyst layer, based on a pressure loss of the oxidizing gas flowing through the cathode flow channel. The fuel cell system of the sixth aspect enables the amount of remaining water in the cathode catalyst layer to be detected by the simpler configuration than the configuration of providing moisture sensors in respective parts of the cathode catalyst layer 217.

(Seventh Aspect)

In the fuel cell system of the fifth aspect, the remaining water detector may detect the amount of remaining water in the cathode catalyst layer, based on an internal resistance of the fuel cell. The fuel cell system of the seventh aspect enables the amount of remaining water in the cathode catalyst layer to be detected by the simpler configuration than the configuration using moisture sensors.

(Eighth Aspect)

In the fuel cell system of any one of the first through seventh aspect, the fuel cell may include: an anode catalyst layer formed on an anode side of the electrolyte membrane; and an anode flow channel configured to make a flow of hydrogen gas toward the anode side of the electrolyte membrane, and the water remover may remove the water retaining in the cathode catalyst layer by increasing at least one of a stoichiometric ratio and temperature of the hydrogen gas flowing through the anode flow channel and thereby increasing an amount of water moving from the cathode catalyst layer toward the anode catalyst layer. The fuel cell system of the eighth aspect enables removal of the retaining water in the cathode catalyst layer while continuing power generation by using the structure of supplying the hydrogen gas to the fuel cell.

(Ninth Aspect)

In the fuel cell system of any one of the first through eighth aspect, the fuel cell may include: an oxidizing gas supplier configured to introduce an oxidizing gas into a cathode flow channel formed along a planar direction of the electrolyte membrane; an oxidizing gas discharger provided at a position opposed to the oxidizing gas supplier and configured to discharge the oxidizing gas from the cathode flow channel; a coolant supplier provided on a side with the oxidizing gas discharger and configured to introduce the coolant into a cooling flow channel formed along the planar direction of the electrolyte membrane; and a coolant discharger provided on a side with the oxidizing gas supplier and configured to discharge the coolant from the cooling flow channel, the fuel cell system may further comprise: an oxidizing gas reducer configured to reduce a flow rate of the oxidizing gas introduced by the oxidizing gas supplier to be lower than a flow rate during operation of the cooling pump, after the start-up of the fuel cell and before the feed of the coolant by the cooling pump. The fuel cell system of the ninth aspect concentrates the electrochemical reaction on the side of the coolant discharger to localize the presence of the produced water, with avoiding the side of the coolant supplier than has the lower temperature than that on the side of the coolant discharger accompanied with the feed of the coolant. This further effectively prevents water from being frozen in the cathode catalyst layer of the fuel cell.

(Tenth Aspect)

In the fuel cell system of any one of the first through eighth aspect, the fuel cell may include: an oxidizing gas supplier configured to introduce an oxidizing gas into a cathode flow channel formed along a planar direction of the electrolyte membrane; an oxidizing gas discharger provided at a position opposed to the oxidizing gas supplier and configured to discharge the oxidizing gas from the cathode flow channel; a coolant supplier provided on a side with the oxidizing gas supplier and configured to introduce the coolant into a cooling flow channel formed along the planar direction of the electrolyte membrane; and a coolant discharger provided on a side with the oxidizing gas discharger and configured to discharge the coolant from the cooling flow channel, the fuel cell system may further comprise: an oxidizing gas increaser configured to increase a flow rate of the oxidizing gas introduced by the oxidizing gas supplier to be higher than a flow rate during operation of the cooling pump, after the start-up of the fuel cell and before the feed of the coolant by the cooling pump. The fuel cell system of the tenth aspect accelerates vaporization of water by the flow of the oxidizing gas on the side of the coolant supplier that has the lower temperature than that on the side of the coolant discharger accompanied with the feed of the coolant, while concentrating the electrochemical reaction on the side of the coolant discharger to localize the presence of the produced water. This further effectively prevents water from being frozen in the cathode catalyst layer of the fuel cell.

(Eleventh Aspect)

In the fuel cell system of any one of the first through tenth aspect, the fuel cell system may further comprise: a current restrictor configured to restrict electric current of the fuel cell to a specific current value that makes an amount of water moving toward the cathode side of the electrolyte membrane smaller than an amount of water moving toward an anode side of the electrolyte membrane, during the feed of the coolant by the cooling pump after the start-up of the fuel cell. The fuel cell system of the eleventh aspect generates electric power with reducing the amount of water retaining in the cathode catalyst layer of the fuel cell during the feed of the coolant to the fuel cell. This further effectively prevents water from being frozen in the cathode catalyst layer of the fuel cell.

(Twelfth Aspect)

A method of the twelfth aspect is directed to a method of operating a fuel cell configured to generate electric power through electrochemical reaction of hydrogen with oxygen, comprising: removing water retaining in a cathode catalyst layer formed on a cathode side of an electrolyte membrane in the fuel cell, after a start-up of the fuel cell and before feed of a coolant to the fuel cell. The method of the twelfth aspect enables removing the water retaining in the cathode catalyst layer of the fuel cell prior to the feed of the coolant to the fuel cell. This method effectively prevents water from being frozen in the cathode catalyst layer of the fuel cell even when the feed of the coolant starts in the cold environment.

The invention is not limited to the fuel cell system but may be applied to variety of other aspects, for example, a car that runs using electric power of the fuel cell, an electric generation system that supplies with electric power of the fuel cell, and a method for manufacturing of the fuel cell. The invention is not limited to the above aspects, but a multiplicity of variations and modifications may be made to these aspects without departing from the scope of the invention.

DESCRIPTION OF EMBODIMENTS

In order to further clarify the configuration and the features of the invention described above, the following describes a fuel cell according to one application of the invention.

A. First Embodiment

A-1. Configuration of Fuel Cell System

Figure 1:
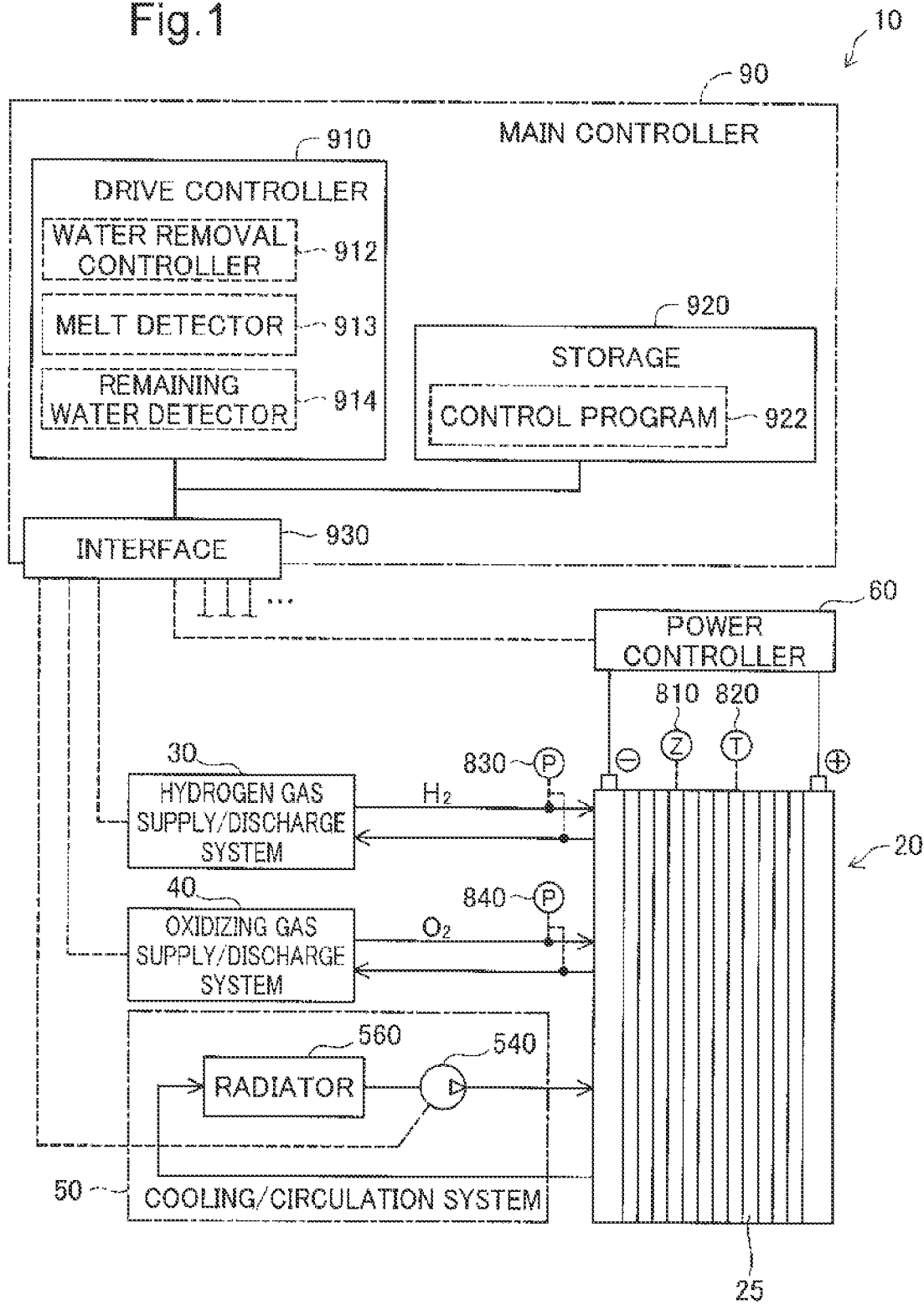
FIG. 1 illustrates the configuration of a fuel cell system.

FIG. 1 illustrates the configuration of a fuel cell system 10. The fuel cell system 10 includes a fuel cell 20 configured to generate electric power through the electrochemical reaction of reactive gases and operates the fuel cell 20 to supply the generated electric power to outside of the fuel cell system 10. According to this embodiment, the fuel cell 20 of the fuel cell system 10 is a polymer electrolyte fuel cell and uses a hydrogen-containing fuel gas and an oxygen-containing oxidizing gas as the reactive gases. The fuel cell system 10 is applied to a system mounted on a vehicle that drives with the electric power generated by the fuel cell 20 according to this embodiment but may also be applicable to a system installed as the power source in a house or a facility and a system incorporated as the power source in electric machine equipment operated with electric power according to other embodiments.

The fuel cell 20 includes a plurality of unit cells 25 that are provided as the basic structure of directly taking the electricity from the reactive gases and stacked electrically in series.

Figure 2:
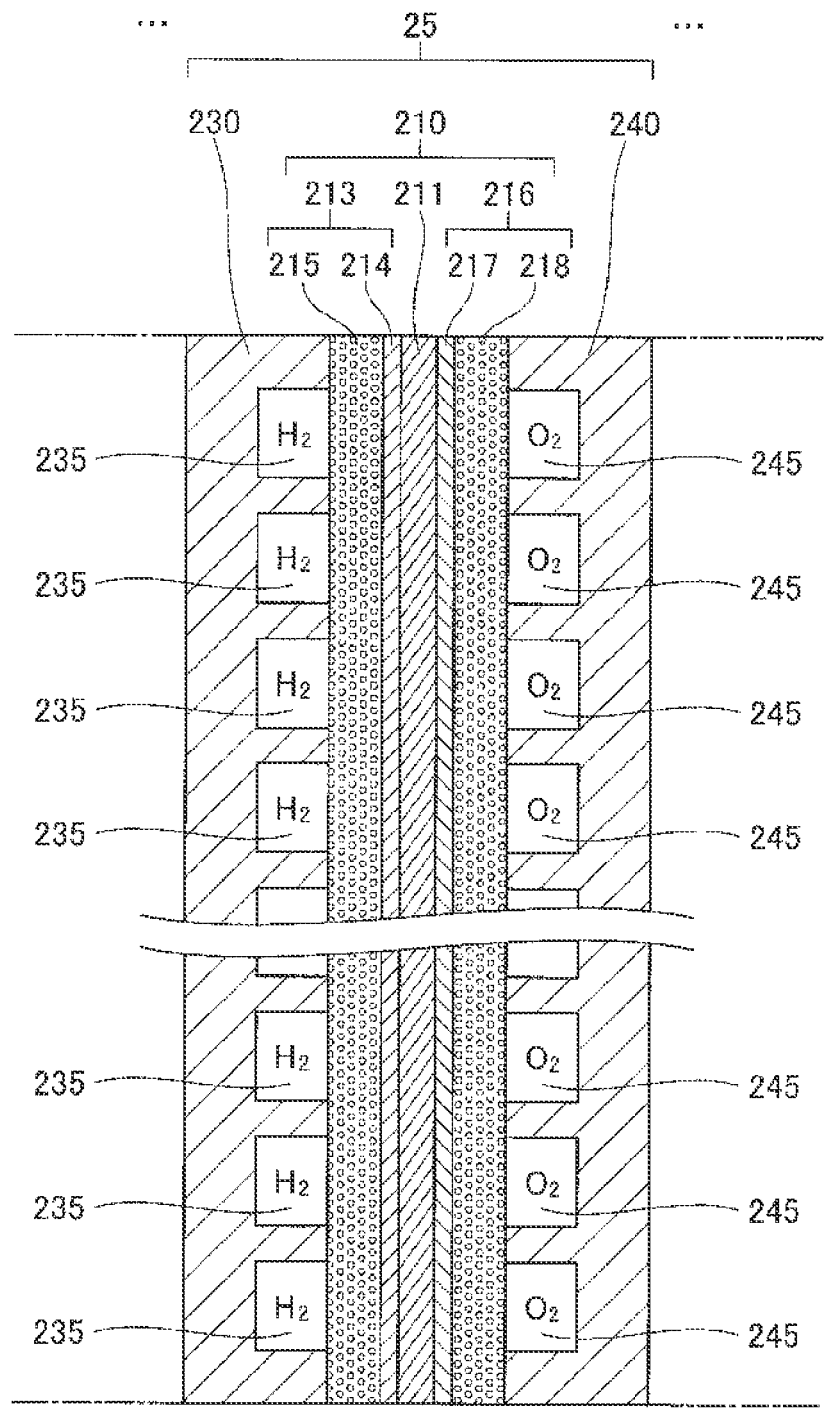
FIG. 2 illustrates the structure of a unit cell in the fuel cell.

FIG. 2 illustrates the structure of each unit cell 25 in the fuel cell 20. The unit cell 25 of the fuel cell 20 includes a membrane electrode assembly (MEA) 210, an anode separator 230 and a cathode separator 240. In the unit cell 25, the MEA 210 is located between the anode separator 230 and the cathode separator 240.

The MEA 210 of the unit cell 25 includes an electrolyte membrane 211, an anode electrode 213 and a cathode electrode 216. The anode electrode 213 of the MEA 210 includes an anode catalyst layer 214 and an anode diffusion layer 215. The cathode electrode 216 of the MEA 210 includes a cathode catalyst layer 217 and a cathode diffusion layer 218. The anode catalyst layer 214 and the anode diffusion layer 215 are stacked in this sequence to form the anode electrode 213 on one surface of the electrolyte membrane 211. The cathode catalyst layer 217 and the cathode diffusion layer 218 are stacked in this sequence to form the cathode electrode 216 on the other surface of the electrolyte membrane 211.

The electrolyte membrane 211 of the MEA 210 is formed from a proton conductive body having proton conductivity, and is given as a perfluorosulfonic acid ion-exchange membrane made of an ionomer resin according to the embodiment. The anode catalyst layer 214 and the cathode catalyst layer 217 of the MEA 210 are formed from a material that has gas permeability and electrical conductivity and supports a catalyst (e.g., platinum or platinum alloy) accelerating the electrochemical reaction of hydrogen with oxygen, and are made of a carbon carrier supporting a platinum-containing catalyst according to this embodiment. The anode diffusion layer 215 and the cathode diffusion layer 218 of the MEA 210 are formed from a material having gas permeability and electrical conductivity, and may be made of, for example, carbon cloth or carbon paper as the carbon porous body.

The anode separator 230 of the fuel cell 20 forms a plurality of anode flow channels 235 to make the flow of the fuel gas on the surface of the anode diffusion layer 215 of the MEA 210. The cathode separator 240 of the fuel cell 20 forms a plurality of cathode flow channels 245 to make the flow of the oxidizing gas on the surface of the cathode diffusion layer 218 of the MEA 210. The anode separator 230 and the cathode separator 240 have sufficient electrical conductivity to collect electricity generated by the MEA 210, while having sufficient durability, heat resistance and gas impermeability to allow the reactive gases to flow in the MEA 210. The anode separator 230 and the cathode separator 240 are made of a carbon resin according to this embodiment but may be made of another material, such as stainless steel, titanium, a titanium alloy or a conductive ceramic material according to other embodiments. The anode flow channels 235 and the cathode flow channels 245 are provided as the spaces formed between the MEA 210 and the respective separators according to this embodiment, but may be provided as porous bodies having a plurality of continuous pores according to another embodiment. The anode separator 230 and the cathode separator 240 are formed separately according to this embodiment, but may be formed integrally according to another embodiment.

The description goes back to FIG. 1. The fuel cell system 10 includes a hydrogen gas supply/discharge system 30, an oxidizing gas supply/discharge system 40, a cooling/circulation system 50, a power controller 60 and a main controller 90 as the components related to the operation of the fuel cell 20.

The hydrogen gas supply/discharge system 30 of the fuel cell system 10 operates with instructions of the main controller 90 to supply the hydrogen gas to the fuel cell 20 and recover the used hydrogen gas discharged from the fuel cell 20. The hydrogen gas supply/discharge system 30 is configured to supply the hydrogen gas from a tank that stores compressed hydrogen according to this embodiment, but may be configured to supply the hydrogen gas from a hydrogen-absorbing alloy that stores absorbed hydrogen or may be configured to supply the hydrogen gas from a reformer that reforms a hydrocarbon fuel, such as natural gas, methanol or gasoline to take out hydrogen according to another embodiments. The hydrogen gas supply/discharge system 30 of this embodiment recirculates and reuses the hydrogen gas used by the fuel cell 20.

The oxidizing gas supply/discharge system 40 of the fuel cell system 10 operates with instructions of the main controller 90 to supply the oxidizing gas to the fuel cell 20 and recover the used oxidizing gas discharged from the fuel cell 20. The oxidizing gas supply/discharge system 40 of this embodiment supplies the air intake from the atmosphere as the oxidizing gas to the fuel cell 20.

The cooling/circulation system 50 of the fuel cell system 10 is configured to make cooling water (antifreeze) as a coolant circulated in the fuel cell 20 and thereby cool down the fuel cell 20. The cooling/circulation system 50 includes a cooling pump 540 and a radiator 560. The radiator 560 of the cooling/circulation system 50 serves to release and dissipate the heat of cooling water taken from the fuel cell 20 to the atmosphere. The cooling pump 540 of the cooling/circulation system 50 operates with instructions of the main controller 90 to feed the cooling water treated by the radiator 560 to the fuel cell 20. The operation of the cooling pump 540 at the start-up of the fuel cell 20 will be described in detail later.

The power controller 60 of the fuel cell system 10 is also called a power control unit and is driven with instructions of the main controller 90 to connect and disconnect the fuel cell 20 with and from a power load and control the electric power output from the fuel cell 20 to the power load. According to this embodiment, the power controller 60 includes a booster converter that increases the voltage of DC power from the fuel cell 20 and an inverter that converts the increased DC power to AC power.

The fuel cell system 10 includes an AC impedance sensor 810, a temperature sensor 820, an anode pressure sensor 830 and a cathode pressure sensor 840 as various sensors used to detect the conditions of the fuel cell 20. These sensors are electrically connected with the main controller 90, and the output signals from the sensors are transmitted to the main controller 90.

The AC impedance sensor 810 of the fuel cell system 10 is provided in the fuel cell 20 to detect an inner-cell resistance that is the internal resistance (AC impedance) of each unit cell 25. The temperature sensor 820 of the fuel cell system 10 is provided in the fuel cell 20 to detect the temperature of the fuel cell 20. The anode pressure sensor 830 of the fuel cell system 10 is provided in the fuel cell 20 to detect an anode pressure loss that is the differential pressure between the supply pressure and the discharge pressure of the hydrogen gas. The cathode pressure sensor 840 of the fuel cell system 10 is provided in the fuel cell 20 to detect a cathode pressure loss that is the differential pressure between the supply pressure and the discharge pressure of the oxidizing gas.

The main controller 90 of the fuel cell system 10 controls the respective components of the fuel cell system 10. The main controller 90 includes a drive controller 910 that controls the operation of the fuel cell 20, a storage 920 that stores various programs and data, and an interface 930 that electrically connects the main controller 90 with the respective components of the fuel cell system 10.

The drive controller 910 of the main controller 90 includes a water removal controller 912, a melt detector 913 and a remaining water detector 914. According to this embodiment, the functions of the respective parts of the drive controller 910 are enabled by the operation of a central processing unit (CPU) of the drive controller 910 based on a control program 922 stored in the storage 920. According to another embodiment, at least part of the functions of the drive controller 910 may be enabled by the operation of an electronic circuit of the drive controller 910 based on its physical circuit structure.

The water removal controller 912 of the drive controller 910 performs control to remove the water retaining in the cathode catalyst layer 217 of the fuel cell 20 after the start-up of the fuel cell 20 and before feed of the cooling water to the fuel cell 20 by the cooling pump 540. According to this embodiment, in order to remove the water retaining in the cathode catalyst layer 217, the water removal controller 912 performs control to introduce the reactive gases into the anode flow channels 235 and into the cathode flow channels 245 of the fuel cell 20 in the state that the fuel cell 20 is isolated from the power load to temporarily suspend the electric current in the fuel cell 20.

The melt detector 913 of the drive controller 910 detects the melt of water frozen in the cathode catalyst layer 217 of the fuel cell 20. According to this embodiment, the melt detector 913 detects the melt of water frozen in the cathode catalyst layer 217, based on the inner-cell resistance represented by the output signal from the AC impedance sensor 810. According to another embodiment, the melt detector 913 may detect the melt of water frozen in the cathode catalyst layer 217, based on the temperature of the fuel cell 20 represented by the output signal from the temperature sensor 820.

The remaining water detector 914 of the drive controller 910 detects the amount of water remaining in the cathode catalyst layer 217 of the fuel cell 20. According to this embodiment, the remaining water detector 914 detects the amount of remaining water in the cathode catalyst layer 217, based on the cathode pressure loss represented by the output signal from the cathode pressure sensor 840. According to another embodiment, the remaining water detector 914 may detect the amount of remaining water in the cathode catalyst layer 217, based on the inner-cell resistance represented by the output signal from the AC impedance sensor 810. According to yet another embodiment, the remaining water detector 914 may detect the amount of remaining water in the cathode catalyst layer 217, based on the anode pressure loss represented by the output signal from the anode pressure sensor 830. According to further another embodiment, the remaining water detector 914 may detect the amount of remaining water in the cathode catalyst layer 217, based on the amount of water represented by the output signal from a moisture sensor provided in the cathode catalyst layer 217.

A-2. Operations of Fuel Cell System

Figure 3:
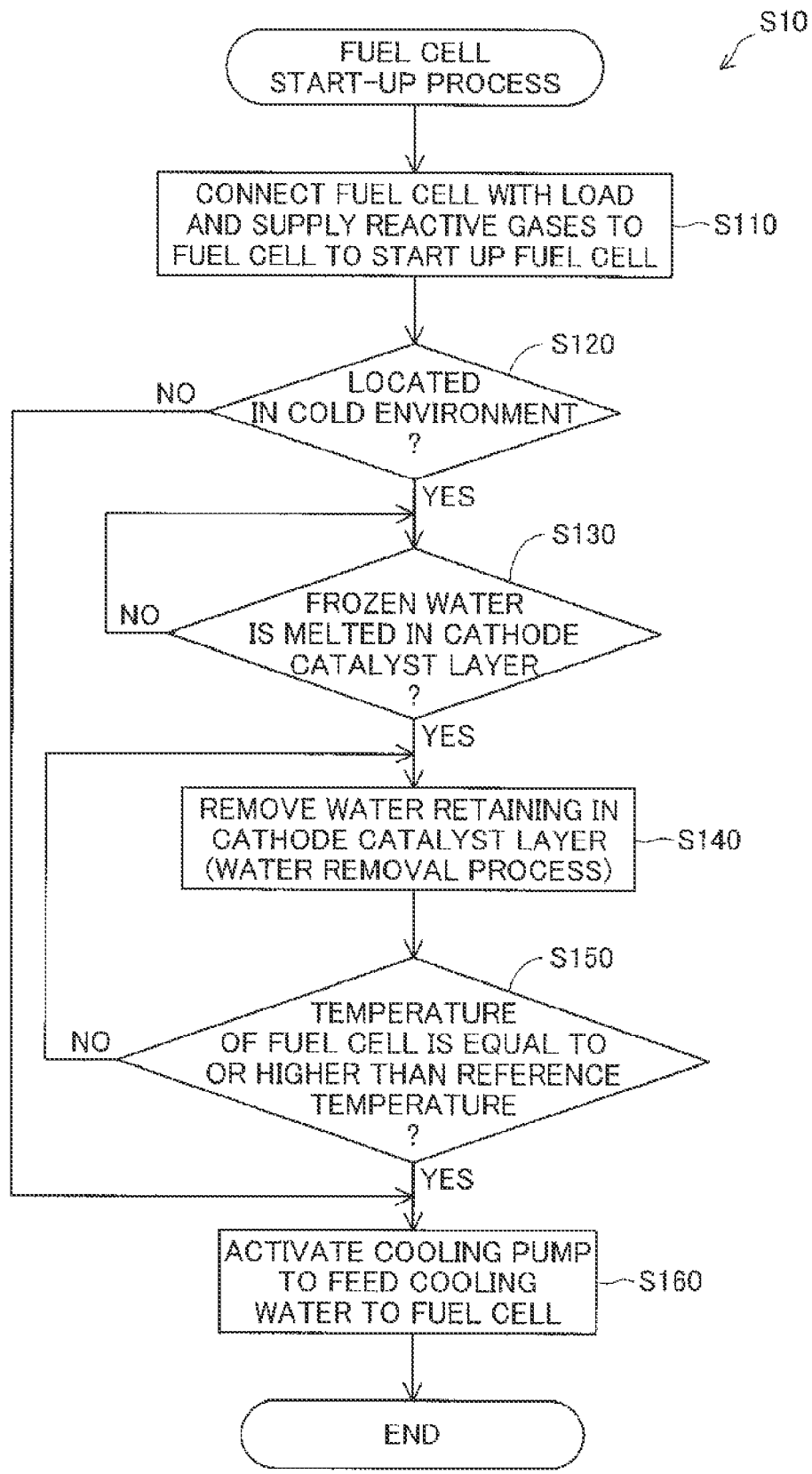
FIG. 3 is a flowchart showing a procedure of fuel cell start-up process performed by a drive controller.

FIG. 3 is a flowchart showing a procedure of fuel cell start-up process (step S10) performed by the drive controller 910. According to this embodiment, the drive controller 910 starts the fuel cell start-up process (step S10) for a start-up of the fuel cell 20.

On the start of the fuel cell start-up process (step S10), the drive controller 910 provides direction to the power controller 60 on connecting the power load to the fuel cell 20, while providing direction to the hydrogen gas supply/discharge system 30 and the oxidizing gas supply/discharge system 40 on supplying the hydrogen gas and the oxidizing gas to the fuel cell 20, so as to start up the fuel cell 20 (step S110). On the start-up of the fuel cell 20, power generation through the electrochemical reaction of hydrogen with oxygen starts in the fuel cell 20, and the temperature of the fuel cell 20 increases with the reaction heat of this electrochemical reaction.

After the start-up of the fuel cell 20 (step S110), the drive controller 910 determines whether the fuel cell 20 is located in the cold environment that may freeze the water remaining in the cathode catalyst layer 217 (step S120). According to this embodiment, the drive controller 910 determines whether the fuel cell 20 is located in the cold environment, based on the temperature of the fuel cell 20 represented by the output signal from the temperature sensor 820.

When it is determined that the fuel cell 20 is not in the cold environment (step S110: NO), the drive controller 910 provides direction to the cooling pump 540 on starting feed of cooling water and thereby activates the cooling pump 540 (step S160). The drive controller 910 subsequently terminates the fuel cell start-up process (step S10) and controls the operation of the fuel cell 20 according to the required power.

When it is determined that the fuel cell 20 is in the cold environment (step S110: YES), on the other hand, the drive controller 910 serves as the melt detector 913 to determine whether the water frozen in the cathode catalyst layer 217 of the fuel cell 20 is melted (step S130), while continuing power generation by the fuel cell 20. According to this embodiment, the drive controller 910 detects the melt of water frozen in the cathode-catalyst layer 217, based on the internal resistance of the unit cell 25 represented by the output signal from the AC impedance sensor 810.

Figure 4:
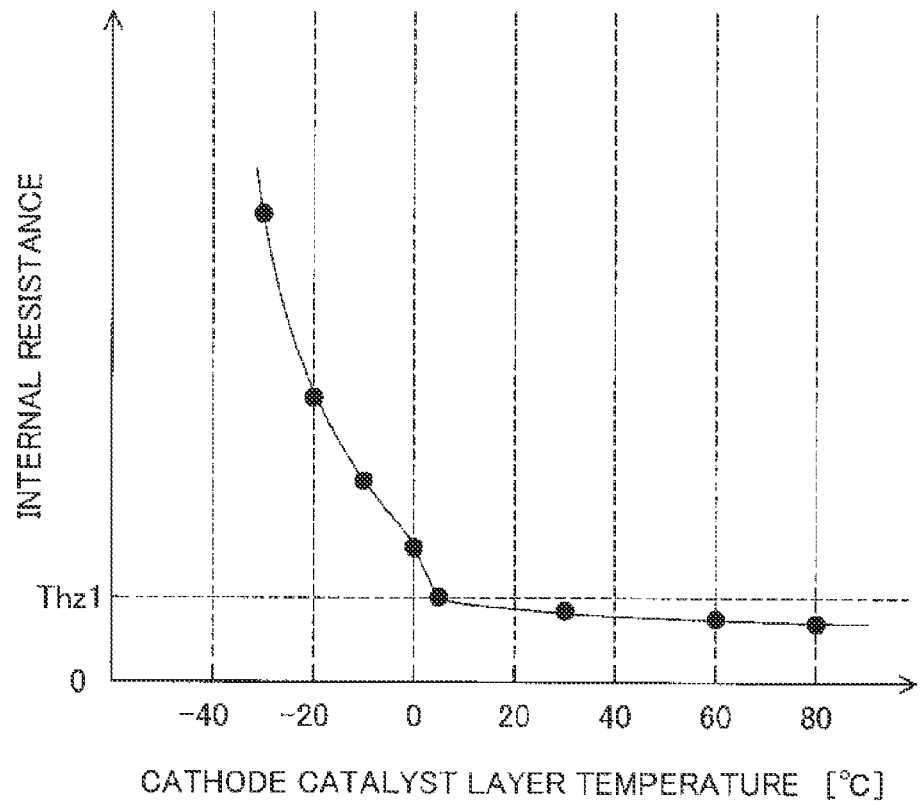
FIG. 4 illustrates the relationship between the cathode catalyst layer temperature and the inner-cell resistance.

FIG. 4 illustrates the relationship between the cathode catalyst layer temperature and the inner-cell resistance. More specifically, the graph of FIG. 4 shows the relationship between the cathode catalyst layer temperature that is the temperature of the cathode catalyst layer 217 and the inner-cell resistance that is the internal resistance of the unit cell 25, with the temperature as the abscissa and the internal resistance as the ordinate. As shown in FIG. 4, the inner-cell resistance decreases with an increase in cathode catalyst layer temperature in a temperature range of the cathode catalyst layer temperature of lower than 0° C. The inner-cell resistance abruptly decreases to a reference value Thz1, as the cathode catalyst layer temperature keeps increasing to approximately 0° C. The inner-cell resistance then degreases gradually. The abrupt decrease in inner-cell resistance around 0° C. may be attributed to reduction of the proton transfer resistance caused by the melt of ice proximate to the cathode catalyst layer 217. According to this embodiment, by taking into account the characteristics of the fuel cell 20 shown in FIG. 4, the drive controller 910 determines that the water frozen in the cathode catalyst layer 217 is melted when the inner-cell resistance represented by the output signal from the AC impedance sensor 810 decreases to or below the reference value Thz1 after the start-up of the fuel cell 20 in the cold environment.

The description goes back to FIG. 3. When the melt of frozen water in the cathode catalyst layer 217 is detected (step S130: YES), the drive controller 910 serves as the water removal controller 912 to perform a water removal process (step S140) that removes the water retaining in the cathode catalyst layer 217.

Figure 5:
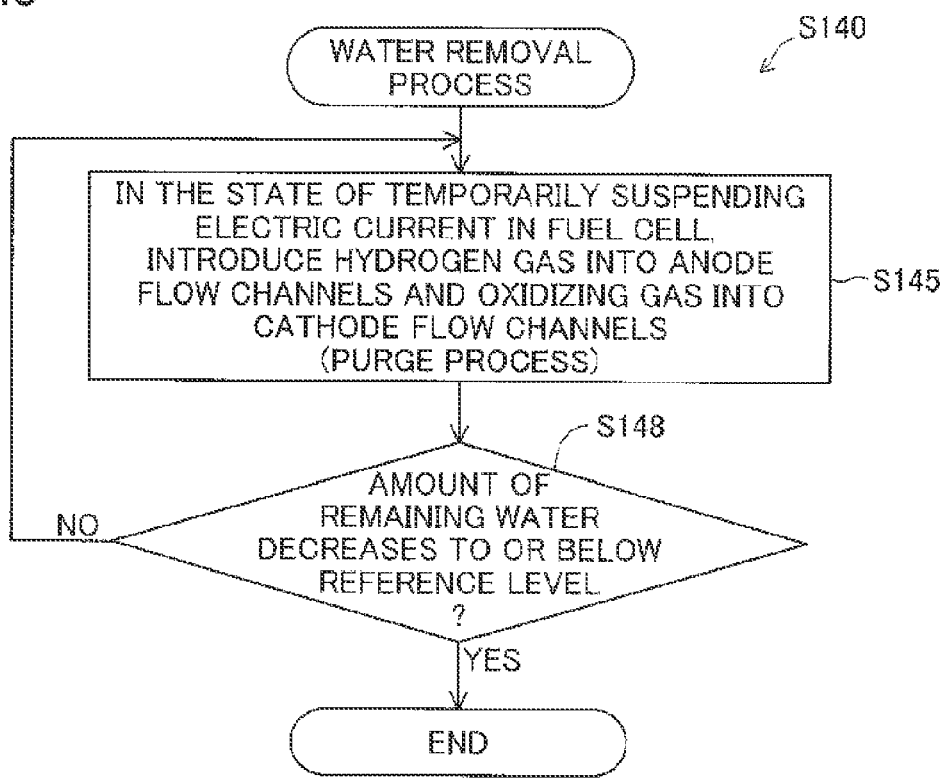
FIG. 5 is a flowchart showing the details of a water removal process.

FIG. 5 is a flowchart showing the details of the water removal process (step S140). On the start of the water removal process (step S140), the drive controller 910 first performs a purge process (step S145). During the purge process (step S145), the drive controller 910 provides direction to the power controller 60 on temporarily disconnecting the power load from the fuel cell 20 to temporarily suspend the electric current in the fuel cell 20. Even during the temporary suspension of the electric current in the fuel cell 20, the drive controller 910 continually provides direction to the hydrogen gas supply/discharge system 30 and the oxidizing gas supply/discharge system 40 on supplying the reactive gases to the fuel cell 20 to introduce the hydrogen gas into the anode flow channels 235 and the oxidizing gas into the cathode flow channels 245.

During the purge process (step S145), the water in the anode flow channels 235 is eliminated by the introduction of the hydrogen gas, while the water in the cathode flow channels 245 is eliminated by the introduction of the oxidizing gas, in the state that production of water accompanied with power generation is temporarily suspended. As the water is eliminated from the anode flow channels 235 and from the cathode flow channels 245, the water retaining in the cathode catalyst layer 217 is removed.

According to this embodiment, even during the purge process (step S145), power generation by the fuel cell 20 is performed intermittently, so that the temperature of the fuel cell 20 intermittently keeps increasing with the reaction heat. The purge process (step S145) introduces both the hydrogen gas and the oxidizing gas according to this embodiment, but may introduce only one of the hydrogen gas and the oxidizing gas according to another embodiment.

During the water removal process (step S140), the drive controller 910 serves as the remaining water detector 914 to determine whether the amount of water remaining in the cathode catalyst layer 217 of the fuel cell 20 decreases to or below a reference level (step S148). According to this embodiment, the drive controller 910 detects the amount of remaining water in the cathode catalyst layer 217, based on the pressure loss of the oxidizing gas represented by the output signal from the cathode pressure sensor 840. When the amount of remaining water in the cathode catalyst layer 217 does not yet decrease to or below the reference level (step S148: NO), the drive controller 910 continues the water removal process (step S140). When the amount of remaining water in the cathode catalyst layer 217 decreases to or below the reference level (step S148: YES), on the other hand, the drive controller 910 terminates the water removal process (step S140).

Figure 6:
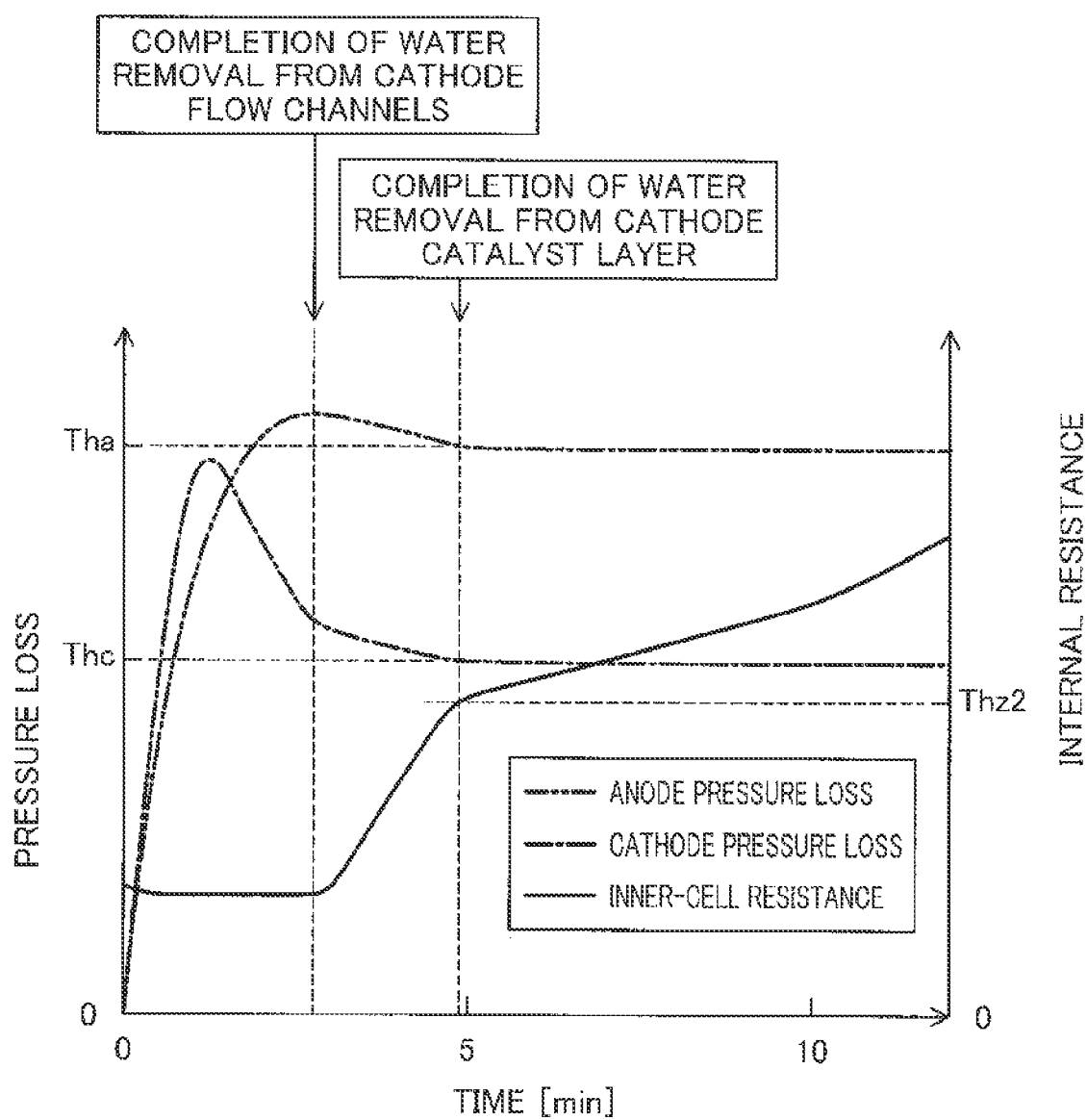
FIG. 6 illustrates variations in anode pressure loss, cathode pressure loss and inner-cell resistance during the water removal process.

FIG. 6 illustrates variations in anode pressure loss, cathode pressure loss and inner-cell resistance during the water removal process (step S140). More specifically, the graph of FIG. 6 shows a time change of the anode pressure loss that is the pressure loss in the anode flow channels 235, a time change of the cathode pressure loss that is the pressure loss in the cathode flow channels 245 and a time change of the inner-cell resistance that is the internal resistance of the unit cell 25, with the time as abscissa and the pressure loss and the internal resistance as the ordinate.

As shown in FIG. 6, the cathode pressure loss starts increasing on the start of supply of the oxidizing gas and keeps increasing to reach a maximum by the influence of the water retaining in the cathode flow channels 245, and subsequently decreases with a decrease in amount of water retaining in the cathode flow channels 245. On completion of water removal from the cathode flow channels 245, the water removal process subsequently starts water removal from the cathode electrode 216 via the cathode flow channels 245, and the cathode pressure loss gradually decreases with a decrease in amount of water retaining in the cathode electrode 216. On completion of water removal from the cathode catalyst layer 217 of the cathode electrode 216, the cathode pressure loss is then kept substantially stable at a reference value Thc. According to this embodiment, by taking into account the characteristics of the fuel cell 20 shown in FIG. 6, the drive controller 910 determines that the amount of water remaining in the cathode catalyst layer 217 decreases to or below the reference level when the pressure loss of the oxidizing gas represented by the output signal from the cathode pressure sensor 840 is kept substantially stable at the reference value Thc.

As shown in FIG. 6, the anode pressure loss starts increasing on the start of supply of the hydrogen gas and keeps increasing to reach a maximum by the influence of the water retaining in the anode flow channels 235, and subsequently decreases with a decrease in amount of water retaining in the anode flow channels 235. On completion of water removal from the cathode flow channels 245, the water removal process subsequently starts water removal from the cathode electrode 216 via the anode electrode 213 and the electrolyte membrane 211, and the anode pressure loss gradually decreases with a decrease in amount of water retaining in the cathode electrode 216. On completion of water removal from the cathode catalyst layer 217 of the cathode electrode 216, the anode pressure loss is then kept substantially stable at a reference value Tha. According to another embodiment, by taking into account the characteristics of the fuel cell 20 shown in FIG. 6, the drive controller 910 may determine that the amount of water remaining in the cathode catalyst layer 217 decreases to or below the reference level when the pressure loss of the hydrogen gas represented by the output signal from the anode pressure sensor 830 is kept substantially stable at the reference value Tha. As shown in FIG. 6, since the cathode pressure loss has a greater change rate to the amount of water in the cathode electrode 216 than the anode pressure loss, it is preferable to use the cathode pressure loss for determination of the amount of water in the cathode electrode 216.

As shown in FIG. 6, the inner-cell resistance is kept substantially stable at a fixed value by the influence of the water remaining in the MEA 210 for a time interval between the melt of water frozen in the cathode catalyst layer 217 and the start of water removal from the cathode electrode 216. On the start of water removal from the cathode electrode 216, the inner-cell resistance then abruptly increases with a decrease in water retaining in the cathode electrode 216. The inner-cell resistance reaches a reference vale Thz2 at the time of completion of the water removal from the cathode catalyst layer 217 of the cathode electrode 216. The inner-cell resistance then gradually increases with a decrease in amount of water retaining in the MEA 210. According to another embodiment, by taking into account the characteristics of the fuel cell 20 shown in FIG. 6, the drive controller 910 may determine that the amount of water remaining in the cathode catalyst layer 217 decreases to or below the reference level when the inner-cell resistance represented by the output signal from the AC impedance sensor 810 reaches or exceeds the reference value Thz2. According to yet another embodiment, the drive controller 910 may detect the amount of remaining water in the cathode catalyst layer 217, based on at least two of the anode pressure loss, the cathode pressure loss and the inner-cell resistance.

The description goes back to FIG. 3. After the water removal process (step S140), the drive controller 910 determines whether the temperature of the fuel cell 20 is equal to or higher than a reference temperature (step S150). According to this embodiment, the drive controller 910 determines that the temperature of the fuel cell 20 is equal to or higher than the reference temperature when the temperature of the fuel cell 20 represented by the output signal from the temperature sensor 820 is a specific temperature that prevents water from being re-frozen in the MEA 210 accompanied with the feed of cooling water. When the temperature of the fuel cell 20 is lower than the reference temperature (step S150: NO), the drive controller 910 performs the water removal process (step S140) again. When the temperature of the fuel cell 20 is equal to or higher than the reference temperature (step S150: YES), on the other hand, the drive controller 910 activates the cooling pump 540 (step S160). The drive controller 910 subsequently terminates the fuel cell start-up process (step S10) and controls the operation of the fuel cell 20 according to the required power.

Figure 7:
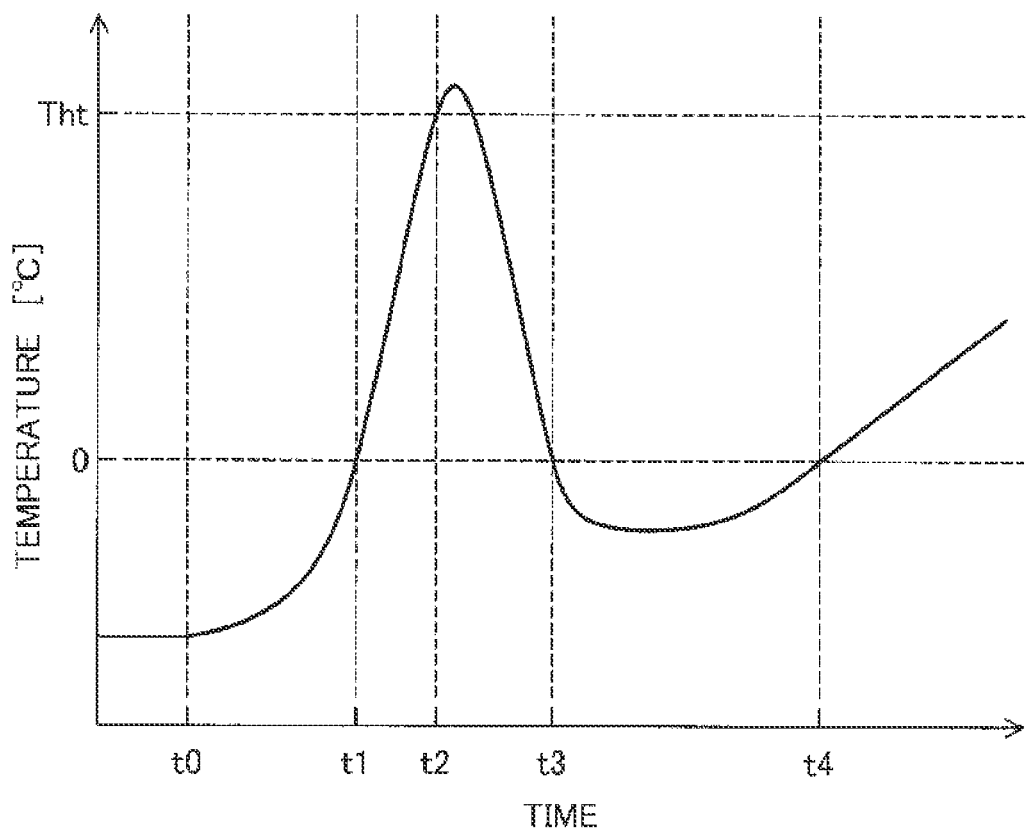
FIG. 7 illustrates a temperature change of the fuel cell during the fuel cell start-up process.

FIG. 7 illustrates a temperature change of the fuel cell 20 during the fuel cell start-up process (step S10). More specifically, the graph of FIG. 7 shows a time change of the temperature of the fuel cell 20, with the time as the abscissa and the temperature as the ordinate. When the fuel cell start-up process (step S10) starts in the cold environment (timing t0 in FIG. 7), the temperature of the fuel cell 20 increases from the freezing range with the reaction heat accompanied with power generation. Even after the temperature of the fuel cell 20 reaches and exceeds 0° C. (timing t1 in FIG. 7) and the water removal process (step S140) starts based on the melt of ice in the cathode catalyst layer 217, the temperature of the fuel cell 20 keeps rising. When the temperature of the fuel cell 20 exceeds a reference temperature Tht (timing t2 in FIG. 7) and the cooling pump 540 is activated, the cooling water cooled in the cold environment is circulated in the fuel cell 20. The temperature of the fuel cell 20 then abruptly decreases again to the freezing range (timing t3 in FIG. 7). The temperature of the fuel cell 20 again increases from the freezing range with the reaction heat accompanied with power generation (timing t4 in FIG. 7).

A-3. Advantageous Effects of First Embodiment

The fuel cell system 10 of the first embodiment described above removes the water retaining in the cathode catalyst layer 217 of the fuel cell 20, before the feed of cooling water to the fuel cell 20. Even when the feed of cooling water starts in the cold environment, this configuration advantageously prevents water from being frozen in the cathode catalyst layer 217 of the fuel cell 20. This results in reducing degradation of the fuel cell 20 in the cold environment.

The water removal process (step S140) introduces the hydrogen gas into the anode flow channels 235 and the oxidizing gas into the cathode flow channels 245 to remove the retaining water from the cathode catalyst layer 217 (step S145). This configuration enables removal of the water retaining in the cathode catalyst layer 217 by using the structure of supplying the reactive gases to the fuel cell 20.

The water removal process (step S140) starts, in response to detection of the melt of water frozen in the cathode catalyst layer 217 (step S130). This configuration enables efficient removal of water in the cathode catalyst layer 217 that is frozen at the time of start-up of the fuel cell 20. Additionally, the melt of water frozen in the cathode catalyst layer 217 is detected, based on the internal resistance of the fuel cell 20. The melt of frozen water in the cathode catalyst layer 217 can thus be detected by the simpler configuration than the configuration of providing temperature sensors in various parts of the cathode catalyst layer 217.

The water removal process (step S140) is terminated in response to detection of the amount of remaining water in the cathode catalyst layer 217 (step S145). This prevents cooling water from being fed to the fuel cell 20 in the state of insufficient removal of the retaining water from the cathode catalyst layer 217. Additionally, the amount of remaining water in the cathode catalyst layer 217 is detected, based on the pressure loss of the oxidizing gas flowing through the cathode flow channels 245. The amount of remaining water in the cathode catalyst layer 217 can thus be detected by the simpler configuration than the configuration of providing moisture sensors in various parts of the cathode catalyst layer 217.

B. Second Embodiment

Figure 8:
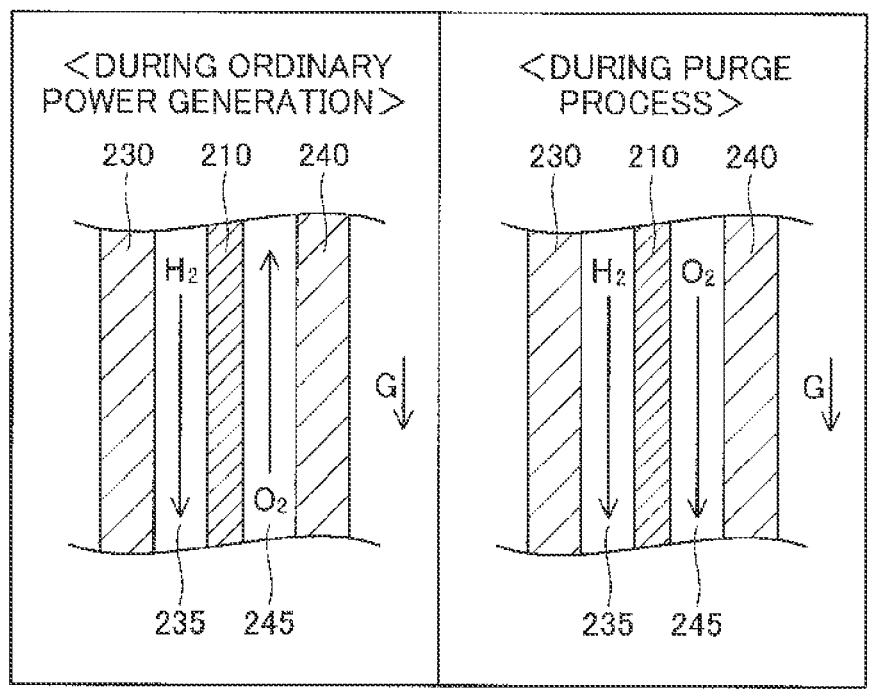
FIG. 8 illustrates the flow directions of reactive gases according to a second embodiment.

The configuration of the fuel cell system 10 according to a second embodiment is similar to that of the first embodiment, except the flow direction of the oxidizing gas in the cathode flow channels 245 during the purge process (step S145). FIG. 8 illustrates the flow directions of the reactive gases according to the second embodiment. More specifically, FIG. 8 shows the flow directions of the reactive gases during ordinary power generation and the flow directions of the reactive gases during the purge process (step S145). During power generation by the fuel cell 20, the flow direction of the hydrogen gas in the anode flow channels 235 is downward along the direction of gravity, i.e., in the same direction as the direction of gravitational force G, while the flow direction of the oxidizing gas in the cathode flow channels 245 is upward along the direction of gravity, i.e., in the opposite direction to the direction of gravitational force G. During the purge process (step S145), the procedure of the second embodiment changes the flow direction of the oxidizing gas in the cathode flow channels 245 to downward along the direction of gravity, while keeping the flow direction of the hydrogen gas in the anode flow channels 235 unchanged as downward along the direction of gravity. According to this embodiment, the flow direction of the oxidizing gas in the cathode flow channels 245 is changed to downward along the direction of gravity by switching over the piping that connects the oxidizing gas supply/discharge system 40 with the fuel cell 20.

The fuel cell system 10 of the second embodiment described above can reduce degradation of the fuel cell 20 in the cold environment, like the first embodiment. Additionally, the configuration of the second embodiment makes the flow of the oxidizing gas downward along the direction of gravity during the purge process (step S145). This enables the water retaining in the cathode catalyst layer 217 to be efficiently removed by using the gravity.

C. Third Embodiment

Figure 9:
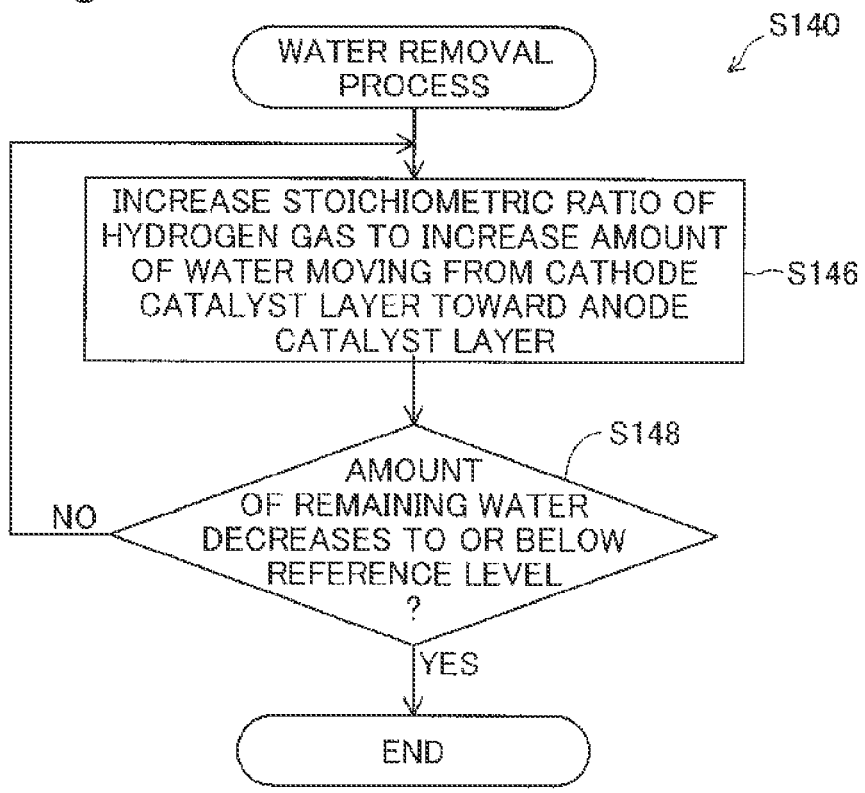
FIG. 9 is a flowchart showing the details of the water removal process according to a third embodiment.

The configuration of the fuel cell system 10 according to a third embodiment is similar to that of the first embodiment, except the detailed operation of the water removal process (step S140). FIG. 9 is a flowchart showing the details of the water removal process (step S140) according to the third embodiment. The water removal process (step S140) of the third embodiment is similar to that of the first embodiment, except the method of removing the retaining water from the cathode catalyst layer 217. On the start of the water removal process (step S140), the drive controller 910 provides direction to the hydrogen gas supply/discharge system 30 on increasing the stoichiometric ratio of the hydrogen gas in order to increase the amount of water moving from the cathode catalyst layer 217 toward the anode catalyst layer 214 (step S146), while continuing power generation of the fuel cell 20. The stoichiometric ratio of the hydrogen gas represents the ratio of the amount of the actual gas supply to the minimum amount of gas required for a certain amount of power generation. The larger stoichiometric ratio means the more excess supply.

Figure 10:
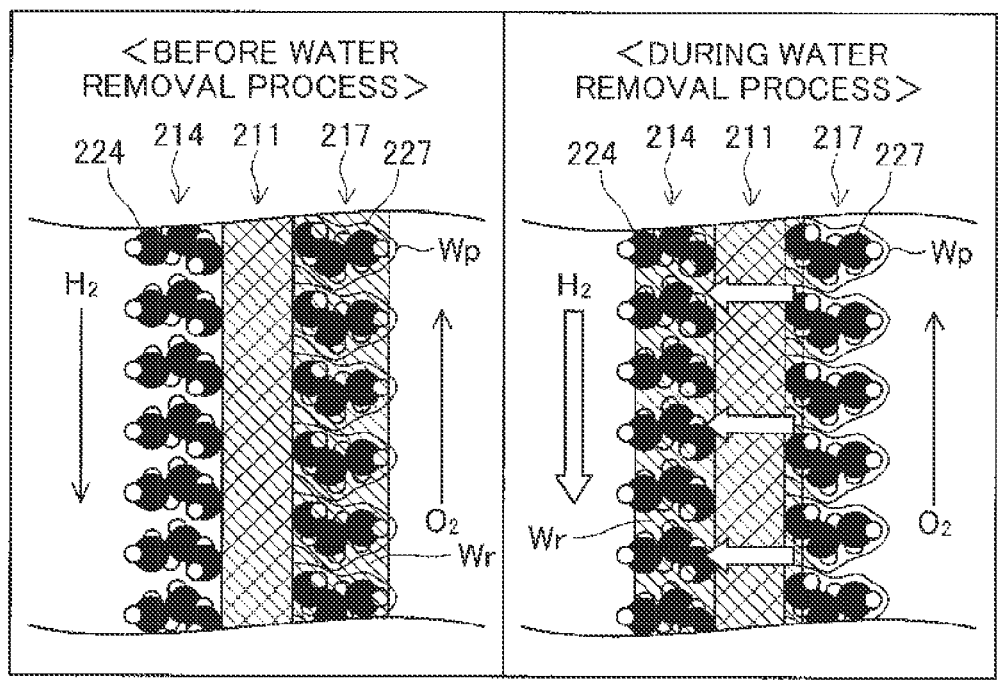
FIG. 10 illustrates the state during the water removal process according to the third embodiment.

FIG. 10 illustrates the state during the water removal process (step S140) according to the third embodiment. More specifically, FIG. 10 shows the periphery of the electrolyte membrane 211 before the water removal process and during the water removal process. The anode catalyst layer 214 is made of catalyst-supporting carbon particles 224 and has voids formed between the catalyst-supporting carbon particles 224. Like the anode catalyst layer 214, the cathode catalyst layer 217 is made of catalyst-supporting carbon particles 227 and has voids formed between the catalyst-supporting carbon particles 227. Water is produced during power generation in the voids between the catalyst-supporting carbon particles 227 of the anode catalyst layer 214.

As shown in FIG. 10, before the water removal process, water retains in the voids between the catalyst-supporting carbon particles 227 of the anode catalyst layer 214. On the start of the water removal process (step S140), the flow rate of the hydrogen gas increases with an increase in stoichiometric ratio of the hydrogen gas. This increases the amount of water taken from the anode catalyst layer 214 by the flow of the hydrogen gas. This accordingly causes the water retaining in the cathode catalyst layer 217 to move across the electrolyte membrane 211 to the anode catalyst layer 214.

The fuel cell system 10 of the third embodiment described above can reduce degradation of the fuel cell 20 in the cold environment, like the first embodiment. Additionally, the water removal process (step S140) increases the amount of water moving from the cathode catalyst layer 217 toward the anode catalyst layer 214 by increasing the stoichiometric ratio of the hydrogen gas, in order to remove the retaining water from the cathode catalyst layer 217 (step S146). This configuration enables removal of the water retaining in the cathode catalyst layer 217 by using the structure of supplying the reactive gases to the fuel cell 20, while continuing power generation.

D. Fourth Embodiment

Figure 11:
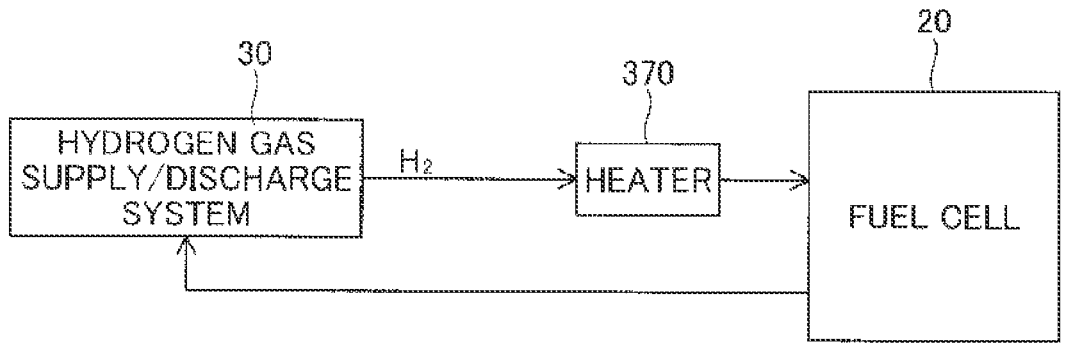
FIG. 11 illustrates the configuration of a hydrogen gas supply-discharge system according to a fourth embodiment.

The configuration of the fuel cell system 10 according to a fourth embodiment is similar to that of the first embodiment, except the configuration relating to the hydrogen gas supply/discharge system 30 and the detailed operation of the water removal process (step S140). FIG. 11 illustrates the configuration of the hydrogen gas supply/discharge system 30 according to the fourth embodiment. The configuration of the fuel cell system 10 of the fourth embodiment is similar to that of the first embodiment, except that a heater 370 is provided to heat the hydrogen gas supplied from the hydrogen gas supply/discharge system 30 to the fuel cell 20. The heater 370 of this embodiment is provided as an electric heater located in the proximity of the piping that supplies the hydrogen gas, and operates with instructions from the drive controller 910.

Figure 12:
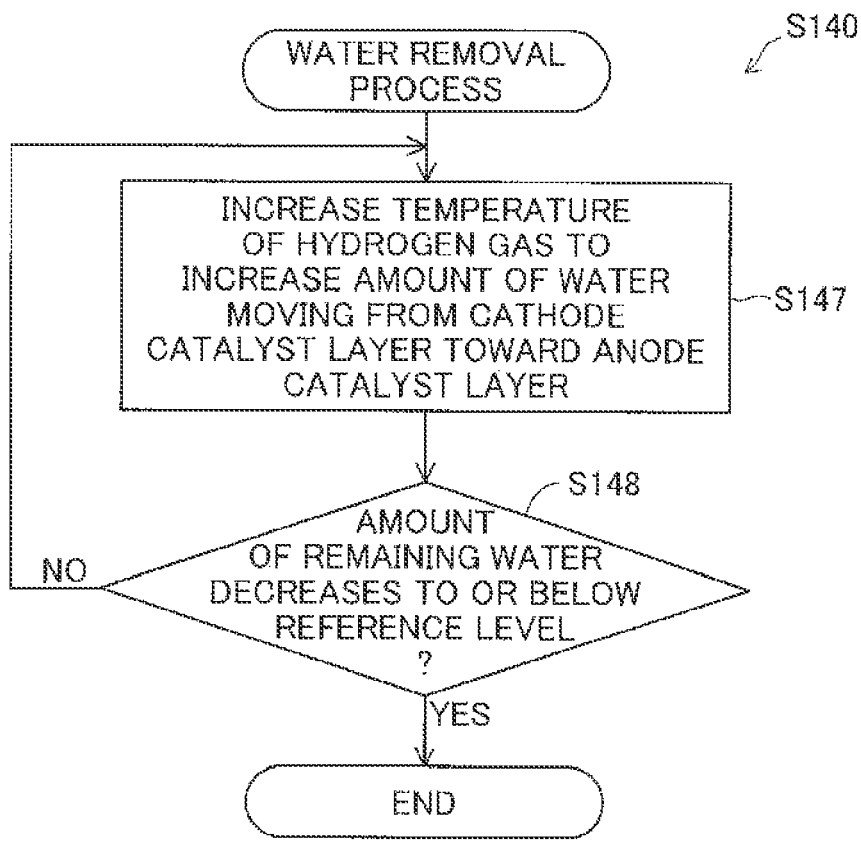
FIG. 12 is a flowchart showing the details of the water removal process according to the fourth embodiment.

FIG. 12 is a flowchart showing the details of the water removal process (step S140) according to the fourth embodiment. The water removal process (step S140) of the fourth embodiment is similar to that of the first embodiment, except the method of removing the retaining water from the cathode catalyst layer 217. On the start of the water removal process (step S140), the drive controller 910 provides direction to the heater 370 on heating the hydrogen gas, so as to increase the amount of water moving from the cathode catalyst layer 217 toward the anode catalyst layer 214 (step S147), while continuing power generation by the fuel cell 20. On the start of the water removal process (step S140), the saturated vapor partial pressure of the hydrogen gas increases with an increase in temperature of the hydrogen gas. This increases the amount of water taken from the anode catalyst layer 214 by the flow of the hydrogen gas. Like the third embodiment shown in FIG. 10, this accordingly causes the water retaining in the cathode catalyst layer 217 to move across the electrolyte membrane 211 to the anode catalyst layer 214.

The fuel cell system 10 of the fourth embodiment described above can reduce degradation of the fuel cell 20 in the cold environment, like the first embodiment. Additionally, the water removal process (step S140) increases the amount of water moving from the cathode catalyst layer 217 toward the anode catalyst layer 214 by increasing the temperature of the hydrogen gas, in order to remove the retaining water from the cathode catalyst layer 217 (step S147). This configuration enables removal of the water retaining in the cathode catalyst layer 217 by using the structure of supplying the reactive gases to the fuel cell 20, while continuing power generation.

E. Fifth Embodiment

Figure 13:
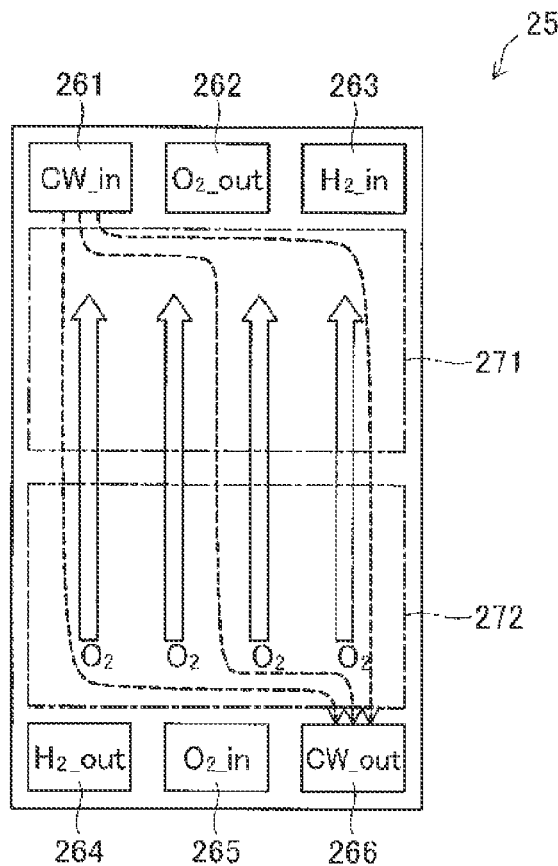
FIG. 13 illustrates the unit cell seen from the stacking direction according to a fifth embodiment.

The configuration of the fuel cell system 10 according to a fifth embodiment is similar to that of the first embodiment, except the method of making the flow of the oxidizing gas to the MEA 20. FIG. 13 illustrates the unit cell 25 seen from the stacking direction according to the fifth embodiment. The unit cell 25 has six holes 261 to 266 that are respectively formed as through holes in the stacking direction. The holes 261, 262 and 263 are aligned along one short side of the rectangular unit cell 25, while the holes 264, 265 and 266 are aligned along the other short side of the rectangular unit cell 25.

The hole 261 serves as a cooling water inlet to introduce the cooling water into the unit cell 25, while forming part of a flow channel for making the flow of the cooling water to be introduced respectively into the plurality of unit cells 25 in the fuel cell 20. The hole 262 serves as an oxidizing gas outlet to discharge the oxidizing gas from the unit cell 25, while forming part of a flow channel for making the flow of the oxidizing gas discharged respectively from the plurality of unit cells 25 in the fuel cell 20. The hole 263 serves as a hydrogen gas inlet to introduce the hydrogen gas into the unit cell 25, while forming part of a flow channel for making the flow of the hydrogen gas to be introduced respectively into the plurality of unit cells 25 in the fuel cell 20.

The hole 264 serves as a hydrogen gas outlet to discharge the hydrogen gas from the unit cell 25, while forming part of a flow channel for making the flow of the hydrogen gas discharged respectively from the plurality of unit cells 25 in the fuel cell 20. The hole 265 serves as an oxidizing gas inlet to introduce the oxidizing gas into the unit cell 25, while forming part of a flow channel for making the flow of the oxidizing gas to be introduced respectively into the plurality of unit cells 25 in the fuel cell 20. The hole 266 serves as a cooling water outlet to discharge the cooling water from the unit cell 25, while forming part of a flow channel for making the flow of the cooling water discharged respectively from the plurality of unit cells 25 in the fuel cell 20.

According to this embodiment, the flow of the hydrogen gas is opposed to the flow of the oxidizing gas and flows from a hydrogen gas upstream area 271 toward a hydrogen gas downstream area 272 of the unit cell 25. In FIG. 13, the open arrows indicate the flow of the oxidizing gas, and the dotted-line arrows indicate the flow of the cooling water. As shown in FIG. 13, the oxidizing gas flows from the hydrogen gas downstream area 272 toward the hydrogen gas upstream area 271 to be opposed to the flow of the hydrogen gas. The cooling water flows from the hydrogen gas upstream area 271 toward the hydrogen gas downstream area 272 to be opposed to the flow of the oxidizing gas.

Figure 14:
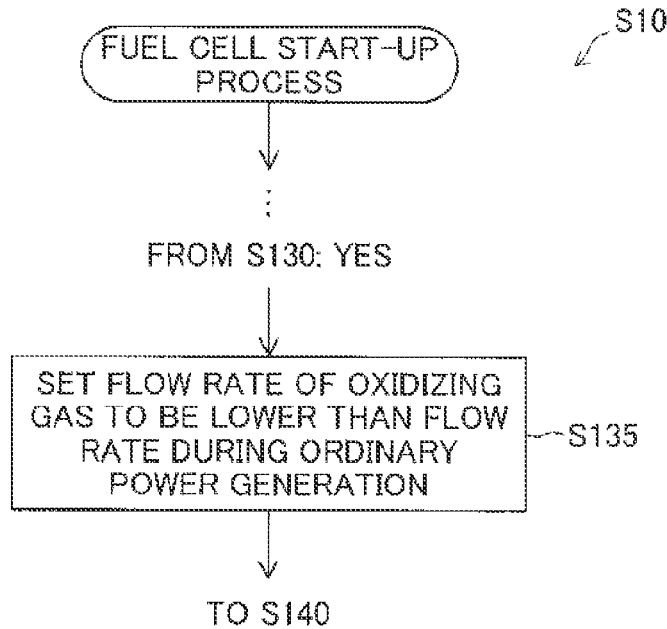
FIG. 14 is a flowchart showing a procedure of the fuel cell start-up process according to the fifth embodiment.

FIG. 14 is a flowchart showing a procedure of the fuel cell start-up process (step S10) according to the fifth embodiment. The fuel cell start-up process (step S10) of the fifth embodiment is similar to that of the first embodiment, except that in response to detection of the melt of frozen water in the cathode catalyst layer 217 (step S130: YES), the flow rate of the oxidizing gas during power generation of the fuel cell 20 is set to be lower than the flow rate during ordinary power generation (step S135). This causes the electrochemical reaction of hydrogen with oxygen to be concentrated not in the hydrogen upstream area 271 where the cooling water flows in but in the hydrogen gas downstream area 272 and thereby localizes the presence of produced water accompanied with power generation in the hydrogen gas downstream area 272.

The fuel cell system 10 of the fifth embodiment described above can reduce degradation of the fuel cell 20 in the cold environment, like the first embodiment. Additionally, the configuration of the fifth embodiment concentrates the electrochemical reaction in the hydrogen gas downstream area 272 to localize the presence of the produced water, with avoiding the hydrogen gas upstream area 271 that has the lower temperature than the temperature of the hydrogen gas downstream area 272 accompanied with the feed of cooling water. This further effectively prevents water from being frozen in the cathode catalyst layer 217 of the fuel cell 20.

F. Sixth Embodiment

Figure 15:
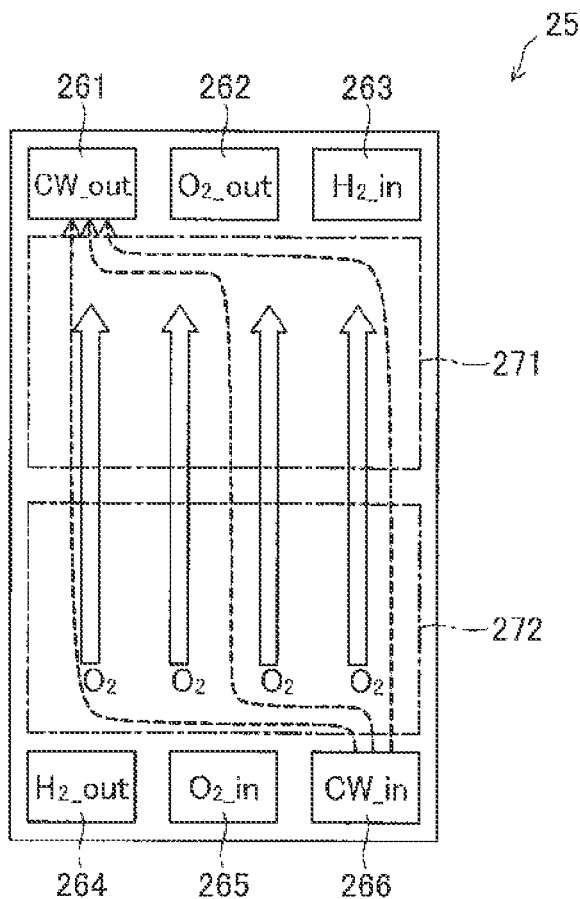
FIG. 15 illustrates the unit cell seen from the stacking direction according to a sixth embodiment.

The configuration of the fuel cell system 10 according to a sixth embodiment is similar to that of the fifth embodiment, except the method of making the flow of the oxidizing gas and the making the flow of cooling water to the MEA 20. FIG. 15 illustrates the unit cell 25 seen from the stacking direction according to the sixth embodiment. The structure of the unit cell 25 is similar to that of the fifth embodiment, except that the flow direction of cooling water is opposed to the flow direction in the fifth embodiment. According to the sixth embodiment, the hole 261 serves as the cooling water outlet to discharge the cooling water from the unit cell 25, while the hole 266 serves as the cooling water inlet to introduce the cooling water into the unit cell 25. The flow directions of the hydrogen gas and the oxidizing gas in the sixth embodiment are the same as those in the fifth embodiment, while the cooling water flows from the hydrogen gas downstream area 272 toward the hydrogen gas upstream area 271, like the flow of the oxidizing gas.

Figure 16:
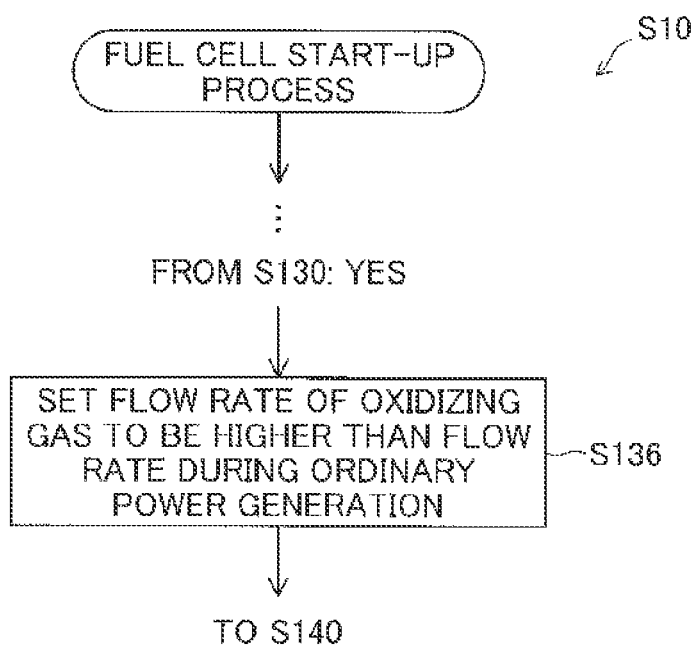
FIG. 16 is a flowchart showing a procedure of the fuel cell start-up process according to the sixth embodiment.

FIG. 16 is a flowchart showing a procedure of the fuel cell start-up process (step S10) according to the sixth embodiment. The fuel cell start-up process (step S10) of the sixth embodiment is similar to that of the first embodiment, except that in response to detection of the melt of frozen water in the cathode catalyst layer 217 (step S130: YES), the flow rate of the oxidizing gas during power generation of the fuel cell 20 is set to be higher than the flow rate during ordinary power generation (step S136). This accelerates vaporization of water by the flow of the oxidizing gas in the hydrogen gas downstream area 272 where the cooling water flows in, while causing the electrochemical reaction of hydrogen with oxygen to be concentrated in the hydrogen upstream area 271.

The fuel cell system 10 of the sixth embodiment described above can reduce degradation of the fuel cell 20 in the cold environment, like the first embodiment. Additionally, the configuration of the sixth embodiment accelerates vaporization of water by the flow of the oxidizing gas in the hydrogen gas downstream area 272 that has the lower temperature than the temperature of the hydrogen gas upstream area 271 accompanied with the feed of cooling water, while concentrating the electrochemical reaction in the hydrogen gas upstream area 271 to localize the presence of the produced water. This further effectively prevents water from being frozen in the cathode catalyst layer 217 of the fuel cell 20.

G. Seventh Embodiment

Figure 17:
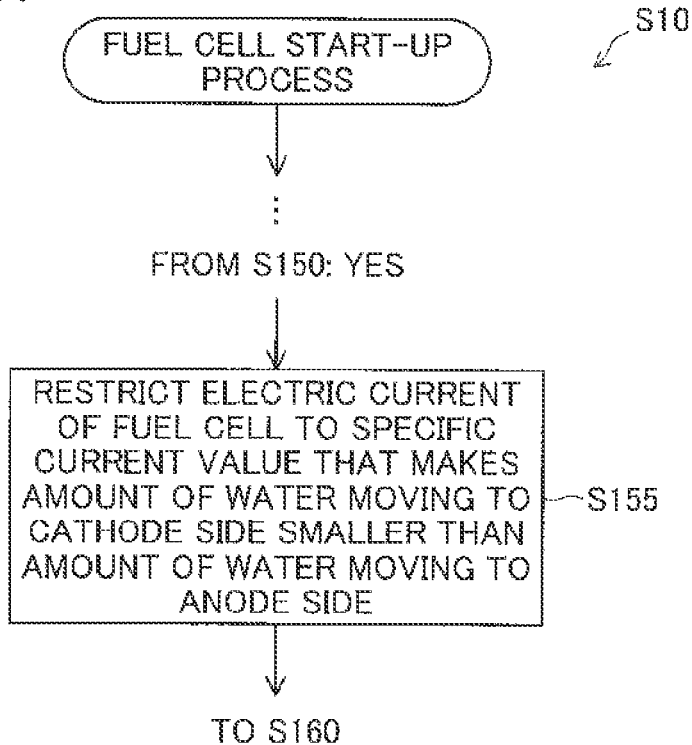
FIG. 17 is a flowchart showing a procedure of the fuel cell start-up process according to a seventh embodiment.

The configuration of the fuel cell system 10 according to a seventh embodiment is similar to that of the first embodiment, except the detailed operation of the fuel cell start-up process (step S10). FIG. 17 is a flowchart showing a procedure of the fuel cell start-up process (step S10) according to the seventh embodiment. In the fuel cell start-up process of the seventh embodiment, the drive controller 910 provides direction to the power controller 60 on restricting the electric current of the fuel cell 20 to a current value Thi (step S155), before activating the cooling pump 540 (step S160). The current value Thi causes the amount of water moving toward the cathode electrode 216 to be smaller than the amount of water moving toward the anode electrode 213.

Figure 18:
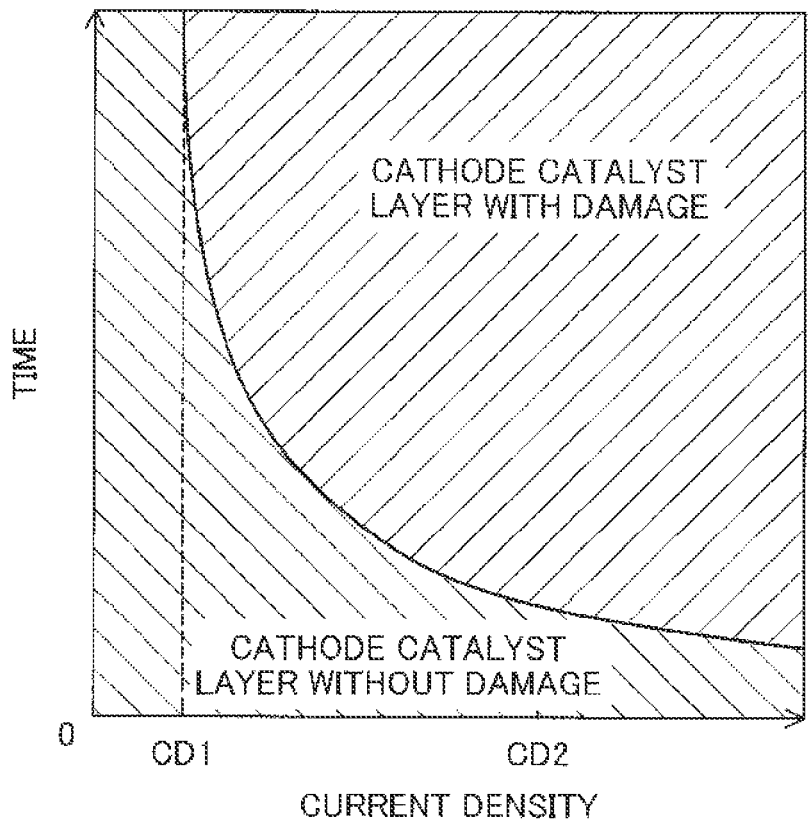
FIG. 18 illustrates the relationship between the current density in an MEA and the damage time of a cathode catalyst layer in the freezing range.

FIG. 18 illustrates the relationship between the current density in the MEA 210 and the damage time of the cathode catalyst layer 217 in the freezing range. More specifically, the graph of FIG. 18 shows the relationship between the current density of the MEA 210 and the damage time of the cathode catalyst layer 217 in the freezing range, with the current density as the abscissa and the time as the ordinate. As shown in FIG. 18, the time to damage the cathode catalyst layer 217 is extended with a decrease in current density of the MEA 210 and is drastically extended with a decrease in current density of the MEA 210 below a reference value CD1.

Figure 19:
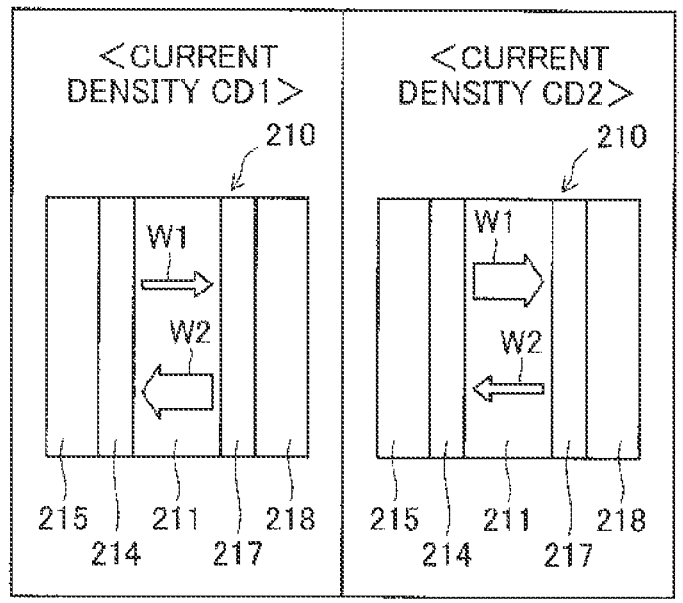
FIG. 19 illustrates migration of water in the MEA.

FIG. 19 illustrates migration of water in the MEA 210. More specifically, FIG. 19 shows the state that the current density of the MEA 210 is equal to the reference value CD1 and the state that the current density of the MEA 210 is equal to another reference value CD2 greater than the reference value CD1. Electro-osmosis water W1 shown in FIG. 19 moves with proton across the electrolyte membrane 211 from the anode catalyst layer 214 toward the cathode catalyst layer 217, and increases with an increase in current density of the MEA 210. Back-diffusion water W2 shown in FIG. 19 moves across the electrolyte membrane 211 from the cathode catalyst layer 217 toward the anode catalyst layer 214 by the water vapor partial pressure difference.

As shown in FIG. 19, when the current density of the MEA 210 is equal to the reference value CD1, the flow of electro-osmosis water W1 is less than the flow of back-diffusion water W2. This reduces the amount of water that moves to the cathode catalyst layer 217 and is frozen and may thus extend the time to damage of the cathode catalyst layer 217. When the current density of the MEA 210 is equal to the reference value CD1, the flow of electro-osmosis water W1 is greater than the flow of back-diffusion water W2. This may cause water moving to the cathode catalyst layer 217 to be successively frozen in the cathode catalyst layer 217 and accelerate the damage of the cathode catalyst layer 217.

Figure 20:
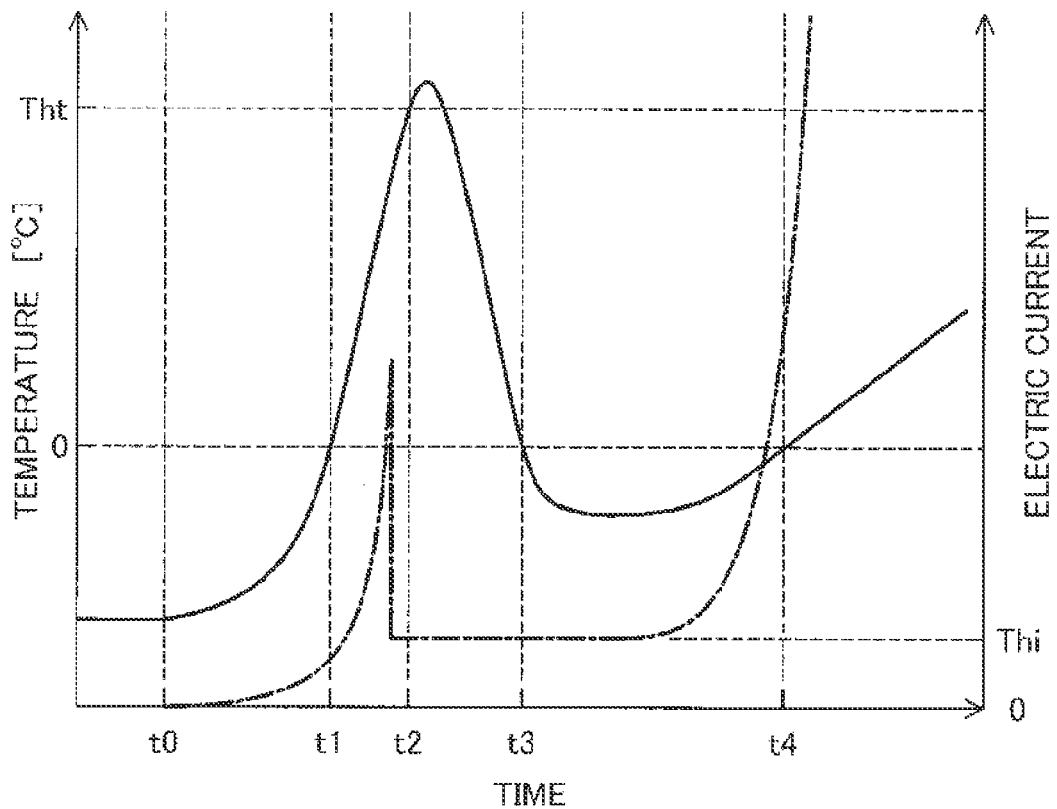
FIG. 20 illustrates a temperature change of the fuel cell according to the seventh embodiment.

FIG. 20 illustrates a temperature change of the fuel cell 20 according to the seventh embodiment. More specifically, the graph of FIG. 20 shows a time change of the temperature and a time change of the electric current in the fuel cell 20, with the time as the abscissa and the temperature and the electric current as the ordinate. In FIG. 20, a solid line curve shows the change in temperature of the fuel cell 20, and a dashed-dotted line curve shows the change in electric current of the fuel cell 20. The temperature change of the fuel cell 20 is identical with that of the first embodiment shown in FIG. 7.

As shown in FIG. 20, on the start of the fuel cell start-up process (step S10) in the cold environment (timing t0 in FIG. 20), the electric current of the fuel cell 20 starts increasing. The electric current restriction of the fuel cell 20 (step S160) on activation of the cooling pump 540 (timing t2 in FIG. 20) then restricts the electric current of the fuel cell 20 to the current value Thi corresponding to the current density of the MEA 210 equal to the reference value CD1. The timing when the electric current restriction of the fuel cell 20 is performed (step S160) may be any time before the timing when the temperature of the fuel cell 20 decreases to the freezing range again with the feed of cooling water (timing t3 in FIG. 20). The execution timing of the electric current restriction of the fuel cell 20 is prior to activation of the cooling pump 540 (step S160) according to this embodiment but may be after activation of the cooling pump 540 (step S160) according to another embodiment. On termination of the fuel cell start-up process (step S10), the electric current of the fuel cell 20 increases to the current value corresponding to the required power.

The fuel cell system 10 of the seventh embodiment described above can reduce degradation of the fuel cell 20 in the cold environment, like the first embodiment. Additionally, the configuration of the seventh embodiment generates electric power with reducing the amount of water retaining in the cathode catalyst layer 217 of the fuel cell 20 during the feed of cooling water to the fuel cell 20. This further effectively prevents water from being frozen in the cathode catalyst layer 217 of the fuel cell 20.

H. Other Embodiments

The invention is not limited to the above embodiments but various modifications and variations may be made to the embodiments without departing from the scope of the invention. For example, the features of at least two embodiments among the first to the seventh embodiments may be applied in combination. According to the embodiment described above, the water removal process (step S140) starts after detection of the melt of water frozen in the cathode catalyst layer 217 (step S130). According to another embodiment, the water removal process (step S140) may start on the start-up of the fuel cell 20, independently of the melt of water frozen in the cathode catalyst layer 217. This enables earlier removal of water produced after the start-up of the fuel cell 20.

The invention claimed is:

1. A fuel cell system that operates a fuel cell configured to generate electric power through electrochemical reaction of hydrogen with oxygen, the fuel cell system comprising:
   a cooling pump configured to feed a coolant to the fuel cell;
   a determining unit configured to determine, after start-up of the fuel cell, whether the fuel cell is located in a cold environment that freezes water in the fuel cell if feeding the coolant is started in starting up the fuel cell; and
   a water remover configured to remove water retaining in a cathode catalyst layer formed on a cathode side of an electrolyte membrane in the fuel cell when the fuel cell located in the cold environment is determined by the determining unit, after a start-up of the fuel cell and before feed of the coolant by the cooling pump,
   further comprising:
   a melt detector configured to detect melt of water frozen in the cathode catalyst layer, wherein
   the water remover starts removal of the water retaining in the cathode catalyst layer when the melt of frozen water is detected by the melt detector, after the start-up of the fuel cell and before the feed of the coolant by the cooling pump.

2. The fuel cell system according to claim 1, wherein
the melt detector detects the melt of the water frozen in the cathode catalyst layer, based on an internal resistance of the fuel cell.

3. The fuel cell system according to claim 1, wherein
the fuel cell includes a cathode flow channel configured to make a flow of an oxidizing gas toward the cathode side of the electrolyte membrane, and
the water remover removes the water retaining in the cathode catalyst layer by introducing the oxidizing gas into the cathode flow channel in a state that electric current of the fuel cell is suspended, after the start-up of the fuel cell and before the feed of the coolant by the cooling pump.

4. The fuel cell system according to claim 1, further comprising:
a remaining water detector configured to detect an amount of remaining water in the cathode catalyst layer, wherein
the water remover terminates removal of the water retaining in the cathode catalyst layer, based on the amount of remaining water detected by the remaining water detector.

5. The fuel cell system according to claim 4, wherein
the fuel cell includes a cathode flow channel configured to make a flow of an oxidizing gas toward the cathode side of the electrolyte membrane, and
the remaining water detector detects the amount of remaining water in the cathode catalyst layer, based on a pressure loss of the oxidizing gas flowing through the cathode flow channel.

6. The fuel cell system according to claim 4, wherein
the remaining water detector detects the amount of remaining water in the cathode catalyst layer, based on an internal resistance of the fuel cell.

7. The fuel cell system according to claim 1, wherein
the fuel cell includes:
an anode catalyst layer formed on an anode side of the electrolyte membrane; and
an anode flow channel configured to make a flow of hydrogen gas toward the anode side of the electrolyte membrane, wherein
the water remover removes the water retaining in the cathode catalyst layer by increasing at least one of a stoichiometric ratio and temperature of the hydrogen gas flowing through the anode flow channel and thereby increasing an amount of water moving from the cathode catalyst layer toward the anode catalyst layer.

8. A method of operating a fuel cell configured to generate electric power through electrochemical reaction of hydrogen with oxygen, comprising:
determining, after start-up of the fuel cell, whether the fuel cell is located in a cold environment that freezes water in the fuel cell if feeding the coolant is started in starting up the fuel cell;
detecting melt of water frozen in the cathode catalyst layer; and
removing water retaining in a cathode catalyst layer formed on a cathode side of an electrolyte membrane in the fuel cell when the fuel cell located in the cold environment is determined and melt of water frozen in the cathode catalyst layer is detected, after a start-up of the fuel cell and before feed of a coolant to the fuel cell.

* * * * *